March 20, 1951     E. FOUQUET     2,545,730
GRINDING MACHINE
Filed Aug. 4, 1947     2 Sheets-Sheet 2
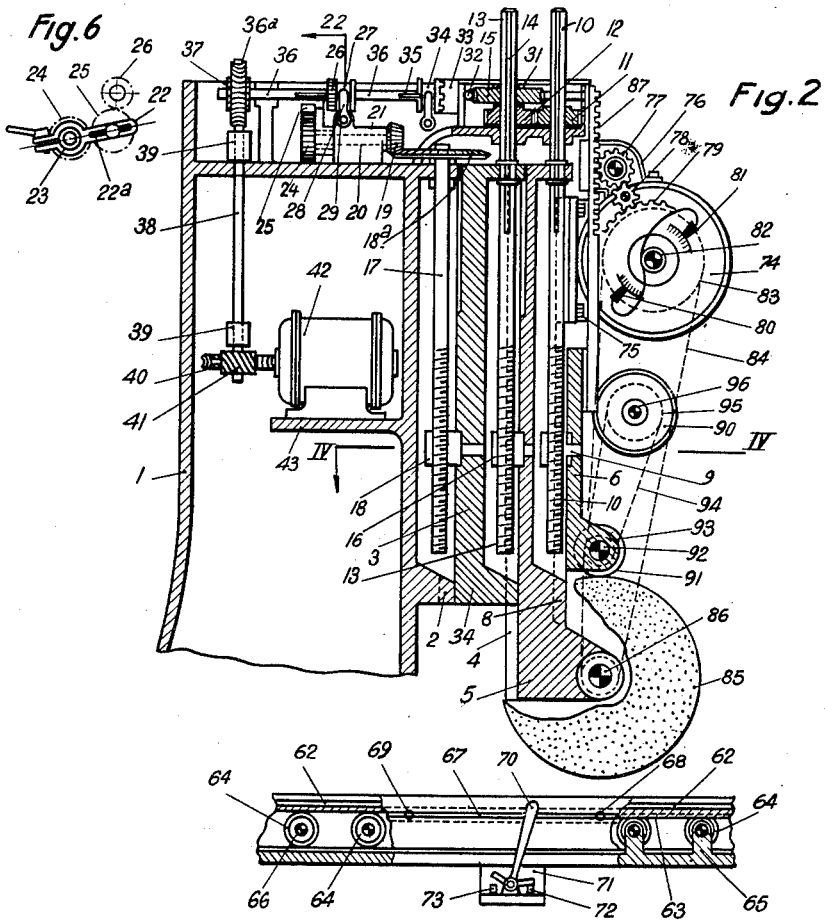

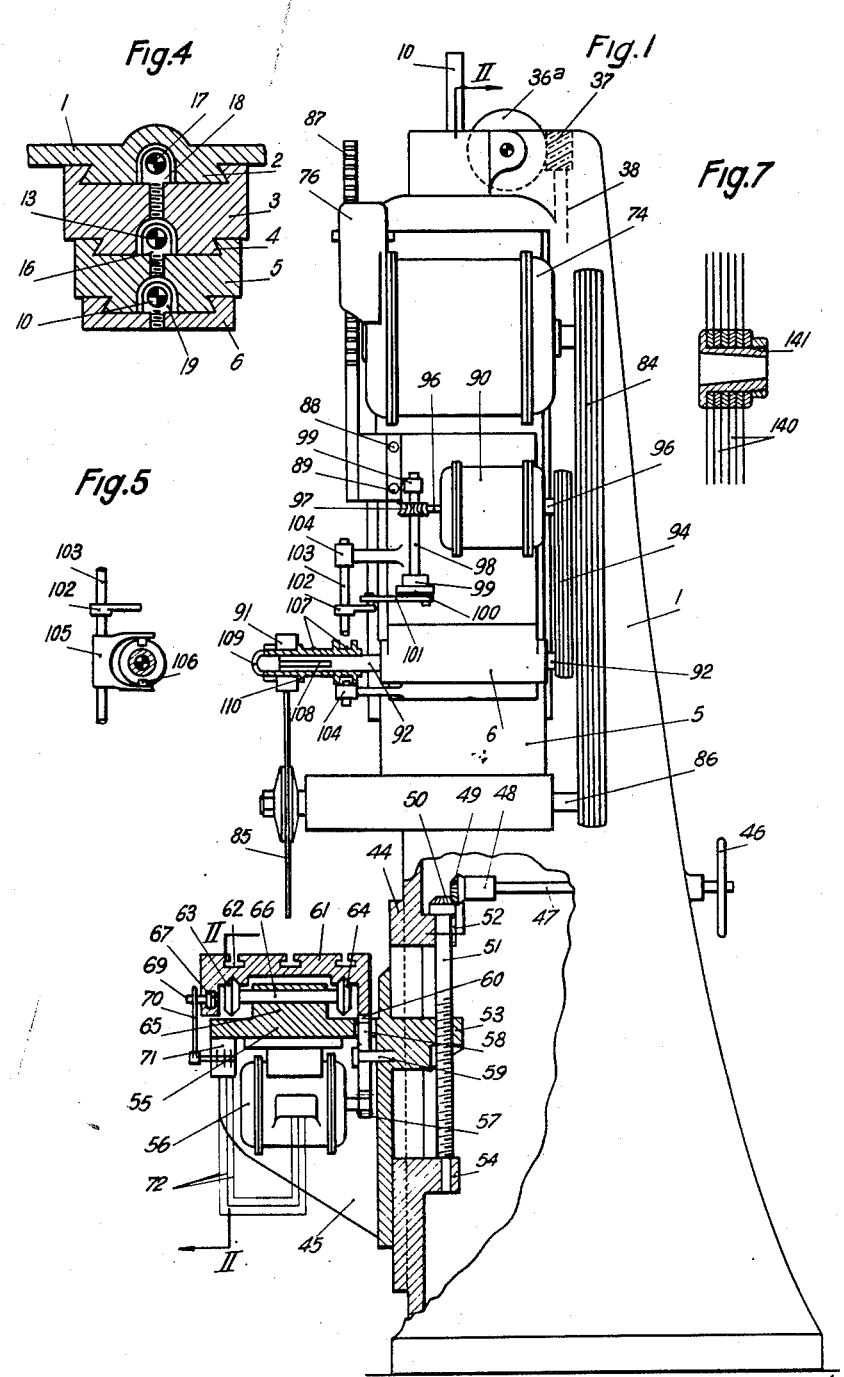

Patented Mar. 20, 1951

2,545,730

UNITED STATES PATENT OFFICE 2,545,730

GRINDING MACHINE

Eugene Fouquet, Bois-Colombes, France

Application August 4, 1947, Serial No. 766,051
In France November 22, 1938

Section 1, Public Law 690, August 8, 1946
Patent expires November 22, 1958

5 Claims. (Cl. 51—92)

1

The present invention has for its object a method of rapid grinding which permits of obtaining by a simple rapid grinding operation machined work pieces produced usually more slowly by means of other kinds of tools. In this method the piece being worked upon is moved at a high speed relatively to the grinder, viz., at a speed that is not less than one metre per second. The employment of such a speed has the advantage of promoting the dissipation of the calories arising from the working of the grinder, but it has the disadvantage of occasioning an intense greasing action on and a very rapid wear of the grinder especially when operating on very hard materials. If the grinding operations be interrupted in order constantly to true the grinder the advantages derived from this speed of working are nullified.

The present invention is characterised in that the work piece is moved with a reciprocatory motion at a high speed, viz., at a speed which is not less than one metre per second, in relation to the grinder which is fed during the operation of the machine to compensate for wear, and there is produced constantly on the grinder while this works on the piece, a trueing over a thickness at least equal to that spoiled by the work.

Such a trueing action has the effect of rapidly progressively reducing the diameter of the grinder. Now, in order to obtain an optimum result from the latter it is necessary that its peripheral speed should preserve a predetermined value. In consequence in accordance with the present invention the angular speed of the grinder is progressively increased in proportion to its decreased diameter in such a manner that its peripheral speed remains constant.

The invention also comprises a machine for carrying out this method. In this machine the trueing of the grinder is effected by a rotatable tool such as a hard roller or cylinder which is displaceable with a rectilinear motion towards the piece to be ground for trueing the grinder, and is retractable in the reverse direction.

In this machine the progressive increase of the angular speed of the grinder is obtained by means of an electric motor the brushes of which are displaced automatically in proportion to the trueing effected on the grinder.

This machine comprises mainly a first carriage which carries the trueing tool and its motor and which can be displaced with a rectilinear feed and return motion relatively to a second carriage which carries the grinder and its motor and which can be itself displaced with a rectilinear feed and return motion in relation to the frame of

2 the machine, the shifting of the brushes of the motor of the first carriage depending upon the relative movement of the first and second carriages, i. e. on the wear on the grinder.

The second carriage and the first carriage are however preferably displaceable as a unit with a feed and return motion not relative to the machine frame, but relative to a third carriage which has a feed and return movement in relation to the frame, this permitting of the displacement of the unit comprising the first and the second carriage without relative displacement of the first and second carriages the one in relation to the other, which permits particularly of lowering the members into working position without having to displace the work table upwardly or to use less hard materials for which constant trueing of the grinder is not necessary. A speed change allows at will of acting either on the third carriage or on the unit comprising the first and second carriages.

By way of example, there has been represented on the annexed drawings a straight grinding machine which permits either thorough machining of the work or a simple grinding operation to be performed. On the drawings:

Figure 1 is a side elevation of the machine, partially in section, showing the rolling path of the work table and the drive of the latter.

Figure 2 is a partial view of the upper part of the machine, in section along the line II—II of Figure 1 and showing also certain parts actually arranged in front of this section (viz., the device for reversing the motion of the work table and the device for varying the speed of the motor driving the grinder).

Figure 3 is a plan view of the upper part of the machine.

Figure 4 is a section along the line IV—IV of Figure 2, after a rotation through 90°.

Figure 5 shows a detail of the system giving the reciprocating translation motion of the roller.

Figure 6 is a detail view of one of the driving part, and

Figure 7 shows an arrangement obtained by piling up a number of very thin grinders on the same shaft.

The grinding machine illustrated comprises a general frame 1 provided with a dovetail slide 2 (Figs. 2 and 4) in which a slide block 3 may slide along a straight path, this slide block being termed "third carriage."

The slide block 3 is provided with the slide 4 on which is another slide block 5 which is termed "second carriage." This slide block 5 carries the carriage 6 which is termed "first carriage" and carries the trueing roller 91 (Figs. 1 and 2). Said first carriage is moveable vertically along the slide 8 by means of a nut 9 co-operating with the threaded spindle 10 which is fixed longitudinally in the carriage 5 and passes through a pinion 11. The spindle 10 is driven round by the pinion 11 by means of a keyed connection which allows said spindle 10 to move longitudinally in the pinion 11. The latter meshes with a pinion 12 which drives round, by means of a keyed connection 14, the threaded spindle 13. The spindle 13 which is fixed longitudinally in the third carriage 3 cooperates with the nut 16 mounted in the second carriage 5. The spindle 13 is also rotatively but not longitudinally keyed to the worm wheel 15.

The third carriage 3 is driven by the nut 18 cooperating with a threaded spindle 17 which is fixed longitudinally in the frame 1 and carries a bevel wheel 18a meshing with a bevel wheel 19 the shaft 20 of which passes through the support 21 and carries a pinion 24 meshing with a wheel 25. The axis of wheel 25 is fixed in a radial slot 22a of a swing plate 22 clamped by means of its clamping collar 23, to the end of support 21. Wheels of various sizes 25 may be employed. When the clamping collar is slackened the plate can swing about shaft 20, this and the slidability of the wheel axis along the slot, allowing for a wheel of different diameter being supported in the plate in gear with wheel 24 and wheel 25 (hereinafter referred to).

The wheel 25 may be brought into mesh with a gear wheel 26 fixed to a block 27 which is non-rotatably slidable on a shaft 36. The slide block 27 is operable by a fork 28 which is driven by the shaft 29 to which is keyed the actuating lever 30.

The shaft 36 carries a worm wheel 36a meshing with a worm 37 keyed to a shaft 38 supported in the bearings 39. The shaft 38 carries at its lower end a worm wheel 40 driven by a worm 41 keyed to the shaft of a motor 42 fixed to a support on frame 1.

The worm wheel 15 is driven in rotation by the worm 31 to the shaft 32 of which is fixed a jaw clutch element 33 adapted to engage a companion clutch element 34 slidable on shaft 36 and driven in rotation with said shaft by the key 35. The slidable clutch element 34 is operable by means of the fork 111 keyed to the shaft 112 carried in the bearings 113—114 and with which is fast the actuating lever 115 (Fig. 3).

Said change speed gear operates as following.

In the position of Fig. 2 motor 42 drives shaft 38, shaft 36 and, because the clutch elements 33, 34 are coupled, shaft 32 and worm wheel 15. Consequently the second carriage 5 is operated.

In the position of Fig. 3 the clutch elements 33, 34 are disconnected and the slide block 27 has slidden on the shaft 36 so that the wheel 26 is in mesh with the wheel 25. Motor 42 drives shaft 38, shaft 36, shaft 20 and spindle 17. Consequently the third carriage 3 is operated.

The frame 1 comprises, at its lower part (Figure 1) a vertical slide 44 in which the angle plate 45 is free to be moved by rotating a hand wheel 46 which is keyed to a shaft 47 supported in the bearing 48. The shaft 47 carries a bevel wheel 49 meshing with another bevel wheel 50 keyed to the screw 51 supported in the bearing 52. The screw 51 is fitted with a nut 53 fixed to the angle plate 45 and rests against the shoulder 54 acting as a stop. The angle plate 45 carries a table 55 under which is arranged the motor 56, the shaft of which carries a pinion 57 meshing with the wheel 58 carried by the shaft 59 screwed into the angle plate 45. The wheel 58 meshes with a rack 60 cut into the upper table 61 provided with T-sectioned grooves 62 and with hollow rails 63 resting on rollers 64. These are mounted on shafts 66 carried in bearings 65 on the angle plate 45.

The table 61, adapted to receive the work, comprises a groove 67 (Figures 1 and 3) in the form of a T, in which it is possible to fix in the required position the knobs 68 and 69 cooperating with the lever 70 of the reversing switch 71 for controlling the motor 56 which is of a known type, rotating in both directions. To this effect, the reversing switch 71 comprises two studs 72 and 73 (Figure 2).

To the grinder carriage 5 is fixed the variable speed motor 74 by means of screws 75 (Fig. 2). This motor is fitted with a speed varying device, in the box 76 of which is arranged a pinion 77 (Figure 2) meshing with a pinion 78 driving the rim 79 carrying the brushes 80 and 81. The entire arrangement is rotatable on the shaft 82 of motor 74, which shaft further receives a pulley 83 over which passes the belt 84 driving the grinder 85. The grinder is keyed to the shaft 86 carried by the grinder carriage 5. The pinion 77 of the speed varying device is driven in rotation by the rack 87 connected to the trueing roller carriage 6 by the screws 88 and 89 (Figure 1).

The carriage 6 further carries a motor 90 which follows the carriage in its motion. On one of the ends of the shaft 96 of the motor is keyed a pulley 95 connected by a belt 94 to another pulley 93 keyed to a shaft 92 on which is angularly keyed by means of a key 108 a freely slidable socket 107 carrying the trueing roller 91. The other end of shaft 96 carries a screw or worm driving the worm wheel 97 (Figure 1) keyed to the shaft 98 rotating in the bearings 99. This shaft 98 drives the crank pin table 100 to which is linked the connecting rod 101 causing an oscillation of lever 102 (Figures 5 and 1) keyed to the shaft 103 carried in the bearing 104. Pins 106 fixed to the arms of a fork 105 fixed to shaft 103 are engaged in the groove of the slidable socket 107 to which is fixed the roller 91 by the threaded socket 109 clamping it against the shoulder 110 of socket 107.

For grinding large surfaces one may use, instead of a simple grinder such as 85, a composite grinder as shown in Figure 7, constituted by a number of thin grinders 140 piled up upon the same hub 141.

The operation is as follows:

The operator regulates the speed of descent of the group of the first and second carriages by appropriately choosing toothed wheels 25 and 26.

Then he puts the motor 42 into operation. By engaging 25—26 by means of the lever 30 and by disengaging 34—33 by means of the lever 115, he determines the lowering of the third carriage 3 towards the workpiece until the grinder 85 is in contact with said piece.

At this moment he puts the motor 56 into operation. The table 61 on which the piece is fixed is reciprocated at a comparatively high speed permitted by the machine; the reversing switch 71 controlled by the lever 70 and on which acts successively the adjustable stops 68 and 69 which are fixed to the table 61, producing automatically the change in the direction of rotation of the motor 56 and of movement of the table 61.

The operator then disengages the gear 25—26 by means of the lever 30 and engages clutch 33—34. Under the action of the motor 42 the threaded spindle 13 turns. By co-operation with the nut 16 the second carriage 5 is caused to descend and this takes with it the first carriage 6. But also the pinion 12 keyed on the shaft 13 turns the pinion 11 and therefore the screwed spindle 10 in the opposite direction. This screwed spindle 10 co-operates with the nut 9 and, as it is screwed with the reverse hand from the spindle 13, the first carriage 6 descends also in relation to the second carriage 5 and in consequence in relation to the grinder 85 which is thus trueing roller 91 in proportion as its diameter diminishes.

What I claim is:

1. In a grinding machine a rotating grinding wheel, a truing wheel rotating at the same linear speed as said grinding wheel and in continuous working contact with said grinding wheel, means for advancing said truing wheel with relation to said grinding wheel and means advancing together said truing wheel and said grinding wheel with relation to the work in reciprocal contact so that the working place of the grinding wheel remains invariable.

2. In a grinding machine, a grinding wheel, a first carrier rotatively carrying said grinding wheel, means carried on said first carrier and rotating said grinding wheel, means for giving said first carrier and said grinding wheel a rectilinear feed and return motion with relation to the work, a second carrier carried by said first carrier, a truing tool rotatively mounted in said second carrier, means carried by said second carrier and rotating said truing tool, means for moving said second carrier with relation to said first carrier a truing tool rotatively mounted in said second carrier, means carried by said second carrier and rotating said truing tool, means for moving said second carrier with relation to said first carrier to advance and remove said truing tool with relation to said grinding wheel, and means responsive to the relative motion of said first and said second carrier for controlling said means for rotating the grinding wheel in order to give the same a constant linear peripheral speed.

3. In a grinding machine comprising a frame and a work table, in combination; a first carriage carried by said frame and rectilinearly slidable with relation to the same, a grinding wheel rotatively mounted in the said first carriage, an electric motor carried on said first carriage and rotating said grinding wheel, means for giving said first carriage a rectilinear feed and return motion with relation to the frame and to the work table, a second carriage carried on said first carriage and rectilinearly slidable with relation to said first carriage along a path parallel to the path of motion of said first carriage with relation to the frame, a truing tool rotatively mounted in said second carriage, an electric motor carried by said second carriage, and rotating said truing tool, means for moving said second carriage with relation to said first carriage to advance and remove said truing tool with relation to said grinding wheel, means fixed to said second carriage, and controlling the speed of said first electric motor carried by said first carriage so as to vary the speed of rotation of the grinding wheel in order to give the same a constant linear peripheral speed.

4. In a grinding machine comprising a frame and a work table, in combination: a first carriage carried by said frame and rectilinearly slidable with relation to the same, a grinding wheel rotatively mounted in said first carriage, an electric motor carried on said first carriage and rotating said grinding wheel, adjustably settable brushes rotatively mounted around the axis of said electric motor, means for giving said first carriage a rectilinear feed and return motion with relation to the frame and to the work table, a second carriage carried on said first carriage and rectilinearly slidable with relation to said first carriage along a path parallel to the path of motion of said first carriage with relation to the frame, a truing tool rotatively mounted on said second carriage, an electric motor carried by said second carriage and rotating said truing tool, means for moving said second carriage with relation to said first carriage to advance and remove said truing tool with relation to said grinding wheel, a rack fixed to said second carriage, a gearing mounted on said first carriage, cooperating with said rack and controlling the rotation of the adjustably settable brushes of said first electric motor so as to vary the speed of rotation of the grinding wheel.

5. In a grinding machine in which the correction of the grinding wheel takes place continuously while the grinding wheel is in working contact with the work, a rotating grinding wheel, a correcting wheel rotating at substantially the same linear speed as said grinding wheel, means advancing said correcting wheel and said grinding wheel together with relation to the work and means interacting with said advancing means for maintaining automatically said correcting wheel in working contact with said grinding wheel in proportion as the diameter of said grinding wheel decreases in consequence of wear.

EUGENE FOUQUET.

REFERENCES CITED

The following references are of record in the file of this patent:

UNITED STATES PATENTS

| Number | Name | Date |
|---|---|---|
| 712,871 | Walker | Nov. 4, 1902 |
| 1,515,039 | Hanson | Nov. 11, 1924 |
| 1,666,237 | Fuller | Apr. 17, 1928 |
| 1,753,448 | Smith | Apr. 8, 1930 |
| 1,866,212 | Huxford et al. | July 5, 1932 |
| 1,886,274 | Kylberg | Nov. 1, 1932 |
| 1,896,533 | Vuillenmier | Feb. 7, 1933 |
| 2,056,871 | Silven | Oct. 6, 1936 |
| 2,162,038 | Trible | June 13, 1939 |
| 2,302,304 | Elberty | Nov. 17, 1942 |
| 2,310,977 | Mathys | Feb. 16, 1943 |

FOREIGN PATENTS

| Number | Country | Date |
|---|---|---|
| 518,019 | Great Britain | Feb. 15, 1940 |
| 578,653 | Great Britain | July 8, 1946 |
| 853,883 | France | Mar. 30, 1940 |